United States Patent
Yokokawa et al.

(10) Patent No.: US 10,990,108 B2
(45) Date of Patent: Apr. 27, 2021

(54) VEHICLE CONTROL SYSTEM

(71) Applicant: Toyota Jidosha Kabushiki Kaisha, Toyota (JP)

(72) Inventors: Shuichi Yokokawa, Susono (JP); Koji Taguchi, Atsugi (JP); Yutaka Aoki, Miyoshi (JP); Masateru Amano, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 583 days.

(21) Appl. No.: 15/868,628

(22) Filed: Jan. 11, 2018

(65) Prior Publication Data

US 2018/0203461 A1 Jul. 19, 2018

(30) Foreign Application Priority Data

Jan. 17, 2017 (JP) .............................. JP2017-005946

(51) Int. Cl.
*G05D 1/02* (2020.01)
*G06K 9/00* (2006.01)
(Continued)

(52) U.S. Cl.
CPC ........... *G05D 1/0274* (2013.01); *B60W 40/06* (2013.01); *G01C 21/30* (2013.01); *G05D 1/0088* (2013.01);
(Continued)

(58) Field of Classification Search
CPC ................. B60W 10/06; B60W 10/22; B60W 2050/0089; B60W 2552/05; B60W 2552/30; B60W 2552/50; B60W 2556/50; B60W 2710/0605; B60W 2710/207; B60W 30/12; B60W 30/18145; B60W 30/18154; B60W 40/06; B60W 2555/60; B60W 2555/80; G01C 21/30; G05D 1/0088;
(Continued)

(56) References Cited

U.S. PATENT DOCUMENTS 5,081,585 A * 1/1992 Kurami ................ G05D 1/0251
180/168
9,676,412 B2 * 6/2017 Kimura ................ B60W 30/10
(Continued)

FOREIGN PATENT DOCUMENTS

DE 112009005449 T5 4/2013
DE 102012218100 A1 4/2014
(Continued)

*Primary Examiner* — Angelina Shudy
(74) *Attorney, Agent, or Firm* — Dinsmore & Shohl LLP

(57) ABSTRACT

A vehicle control system includes a vehicle-mounted sensor, a map database, a control rule database, and an electronic control unit. The electronic control unit is configured to recognize the position of a vehicle on a map; control traveling of the vehicle by using one of a plurality of control rules based on the position of the vehicle on the map, map information, and a detection result of the vehicle-mounted sensor; recognize a road section in the traveling direction of the vehicle based on the position of the vehicle on the map and the map information; specify a control rule used in the road section based on the recognized road section and control rule data; and control traveling of the vehicle in the road section by using the specified control rule.

11 Claims, 7 Drawing Sheets

(51) Int. Cl.
*G01C 21/30* (2006.01)
*G05D 1/00* (2006.01)
*B60W 40/06* (2012.01)

(52) U.S. Cl.
CPC ....... *G05D 1/0278* (2013.01); *G06K 9/00798* (2013.01); *G06K 9/00805* (2013.01); *B60W 2552/05* (2020.02); *G05D 2201/0213* (2013.01)

(58) Field of Classification Search
CPC .............. G05D 1/0274; G05D 1/0278; G05D 2201/0213; G06K 9/00798; G06K 9/00805
See application file for complete search history.

(56) References Cited

U.S. PATENT DOCUMENTS

| | | | |
|---|---|---|---|
| 2003/0182038 A1* | 9/2003 | Iwazaki | B62D 6/002 |
| | | | 701/41 |
| 2005/0273236 A1* | 12/2005 | Mori | B62D 15/0285 |
| | | | 701/41 |
| 2009/0326751 A1* | 12/2009 | Otake | B60T 7/22 |
| | | | 701/25 |
| 2012/0203440 A1 | 8/2012 | Matsunaga | |
| 2017/0225686 A1* | 8/2017 | Takaso | B60W 30/12 |
| 2017/0341652 A1* | 11/2017 | Sugawara | G08G 1/09623 |
| 2018/0312161 A1* | 11/2018 | Asakura | B60W 10/18 |
| 2019/0156599 A1* | 5/2019 | Jammoussi | B60W 30/02 |
| 2019/0390612 A1* | 12/2019 | Ogawa | B60W 10/06 |
| 2020/0070813 A1* | 3/2020 | Ogawa | F02D 41/12 |

FOREIGN PATENT DOCUMENTS

| | | | |
|---|---|---|---|
| DE | 102014006559 A1 | | 11/2015 |
| JP | H07192194 A | | 7/1995 |
| JP | H10122347 A | | 5/1998 |
| JP | 2000207692 A | | 7/2000 |
| JP | 2004331026 A | | 11/2004 |
| JP | 2007015606 A | | 1/2007 |
| JP | 2015138330 A | * | 7/2015 |
| JP | 2016040139 A | | 3/2016 |

* cited by examiner

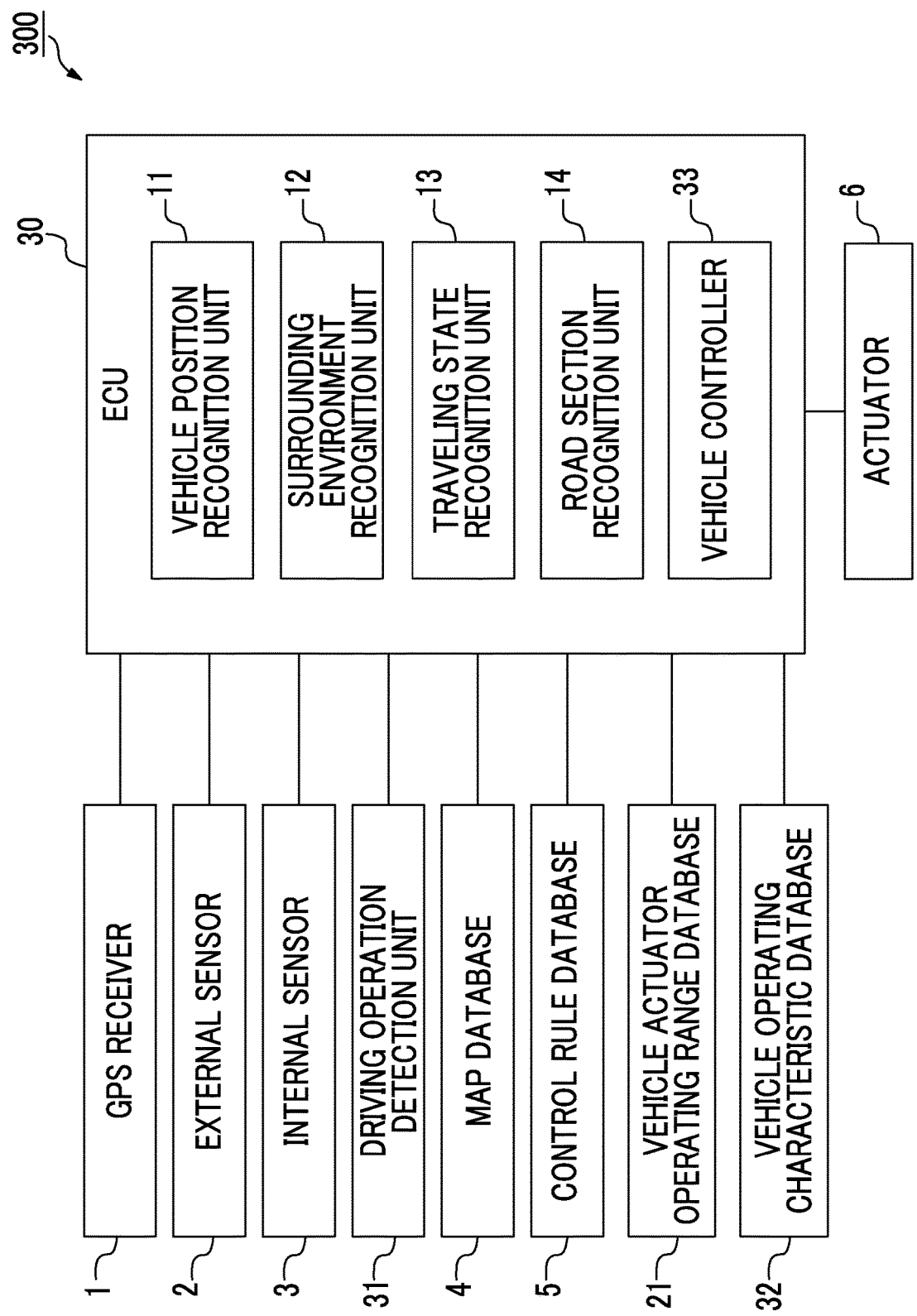

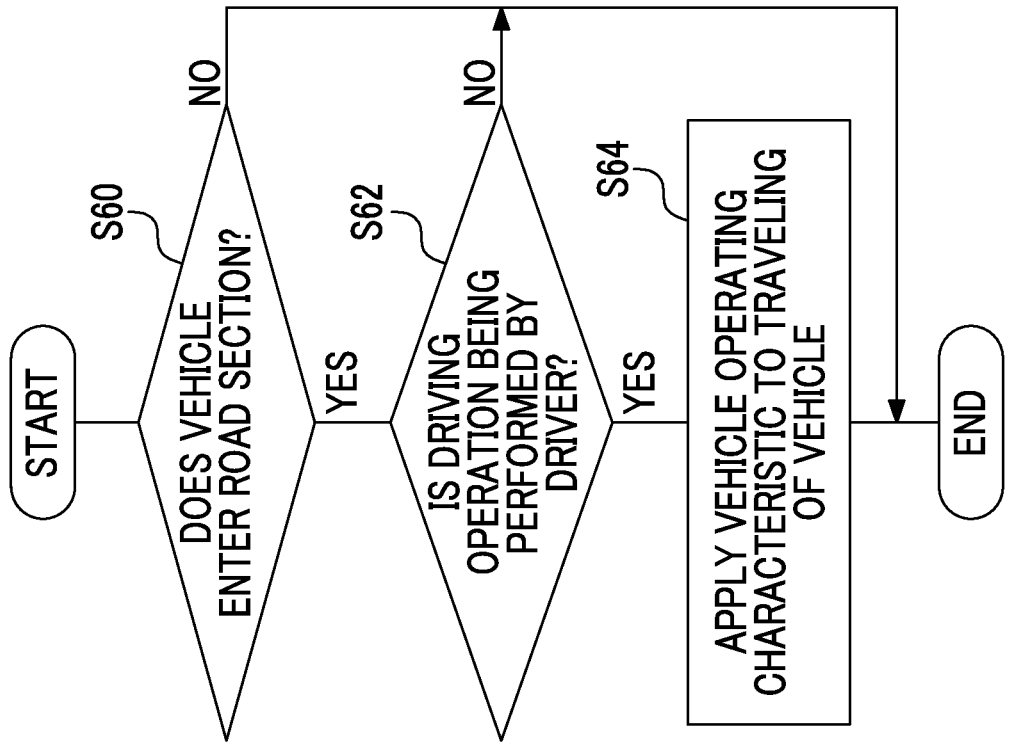
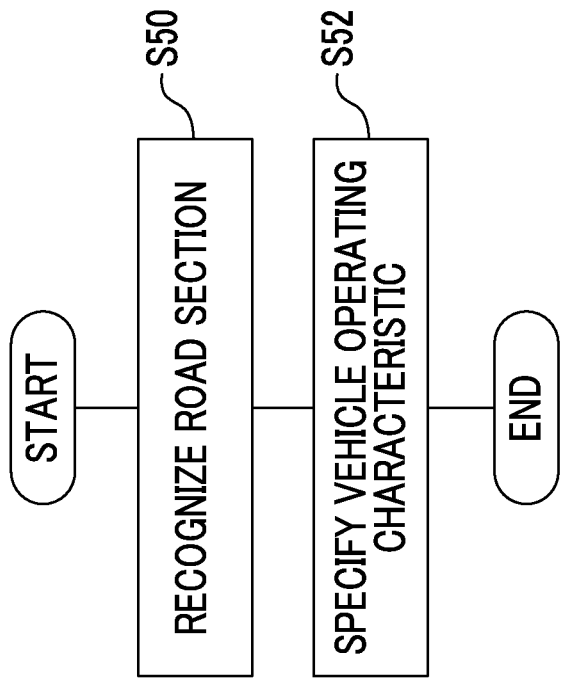

VEHICLE CONTROL SYSTEM

CROSS-REFERENCE TO RELATED APPLICATIONS

This application claims priority to Japanese Patent Application No. 2017-005946 filed on Jan. 17, 2017, which is incorporated herein by reference in its entirety including the specification, drawings and abstract.

BACKGROUND

1. Technical Field

The disclosure relates to a vehicle control system.

2. Description of Related Art

Japanese Unexamined Patent Application Publication No. 7-192194 (JP 7-192194 A) is known in the related art as a technical document related to a vehicle control system. A vehicle control system that reads an altitude, a gradient, a curvature, and the like related to a road on which a vehicle travels, based on map information stored in advance, and changes a control target of the vehicle control system to the optimal target based on the read road information is disclosed in the technical document.

SUMMARY

In the related art, the control target of the vehicle control system is optimized from the altitude, the gradient, the curvature, and the like related to the road. However, the altitude, the gradient, and the like are a part of parameters related to the road. Changing the control target uniformly based on the parameters does not sufficiently consider the actual road environment, and there is room for improvement in realizing appropriate vehicle control.

In the present technical field, it is desirable to provide a vehicle control system that can control traveling of a vehicle in accordance with the actual road environment.

An aspect of the present disclosure relates to a vehicle control system including a vehicle-mounted sensor, a map database, a control rule database, and an electronic control unit. The vehicle-mounted sensor is configured to detect a traveling state of a vehicle and an environment surrounding of the vehicle. The map database is configured to store map information. The control rule database is configured to store control rule data in which one of a plurality of control rules set in advance is associated with each road section set in advance on a map. The electronic control unit is configured to recognize a position of the vehicle on the map; control traveling of the vehicle by using one of the control rules based on the position of the vehicle on the map, the map information, and a detection result of the vehicle-mounted sensor; recognize the road section in the traveling direction of the vehicle based on the position of the vehicle on the map and the map information; specify the control rule used in the road section based on the recognized road section and the control rule data; and control traveling of the vehicle in the road section by using the specified control rule.

According to the aspect of the present disclosure, an appropriate control rule is stored in association with each road section on the map, and traveling of the vehicle can be controlled with the stored control rule when the vehicle travels in the road section. Accordingly, the vehicle can be controlled with an appropriate control rule corresponding to the actual road environment, compared to a system in the related art that uniformly changes a control value based on a part of parameters such as an altitude or a gradient in the map information. Accordingly, the vehicle control system according to the aspect of the present disclosure can improve the stability of traveling of the vehicle and ride quality by controlling the vehicle with an appropriate control technique corresponding to the actual road environment.

The vehicle control system according to the aspect of the present disclosure may further include a vehicle actuator operating range database that stores operating range data in which one of a plurality of vehicle actuator operating ranges set in advance is associated with each road section on the map. The electronic control unit may be configured to specify the vehicle actuator operating range applied in the road section based on the recognized road section and the operating range data, and control traveling of the vehicle in the road section within the range of the specified vehicle actuator operating range. According to the aspect of the present disclosure, an appropriate vehicle actuator operating range is stored in association with each road section on the map, and traveling of the vehicle can be controlled in the stored vehicle actuator operating range when the vehicle travels in the road section. Thus, the vehicle can be controlled with an appropriate vehicle actuator operating range corresponding to the actual road environment.

In the vehicle control system according to the aspect of the present disclosure, the electronic control unit may be configured to apply an operating range in which a guard value of a steering angle in the operating range of a steering actuator is greater than a reference value, when the road section is a curvature changing section in which a rate of change in a curvature of the road is greater than or equal to a certain value.

In the vehicle control system according to the aspect of the present disclosure, the electronic control unit may be configured to apply an operating range in which a guard value of drive power in the operating range of a throttle actuator is less than a reference value, when the road section is a road section that has a curvature of the road greater than or equal to a certain value and a rate of change in curvature greater than or equal to a certain value and has a wall set on a side of the road.

In the vehicle control system according to the aspect of the present disclosure, the electronic control unit may be configured to apply an operating range in which a guard value of a steering angle, a guard value of steering torque, and a guard value of drive power in the operating range of a steering actuator are greater than a reference value, when the road section is a merging section in which a plurality of lanes merges, or a branch section in which a lane in which the vehicle travels branches into a plurality of lanes.

The vehicle control system according to the aspect of the present disclosure may further include a driving operation detection unit configured to detect a driving operation performed by a driver of the vehicle, and a vehicle operating characteristic database configured to store vehicle operating characteristic data in which one of a plurality of vehicle operating characteristics set in advance is associated with each road section on the map. The electronic control unit may be configured to specify the vehicle operating characteristic applied in the road section based on the recognized road section and the vehicle operating characteristic data during the driving operation performed on the vehicle by the driver, and apply the vehicle operating characteristic to traveling of the vehicle in the road section during the driving operation performed on the vehicle by the driver. According to the aspect of the present disclosure, appropriate vehicle operating characteristic data is stored in association with each road section on the map, and an appropriate vehicle operating characteristic can be applied to traveling of the vehicle based on the stored vehicle operating characteristic data when the vehicle travels in the road section. Thus, the driver can drive the vehicle with an appropriate vehicle operating characteristic corresponding to the actual road environment.

In the vehicle control system according to the aspect of the present disclosure, the electronic control unit may be configured to apply, to traveling of the vehicle, a vehicle operating characteristic that decreases a head-turning property of the vehicle from a reference value and increases steering reaction force from a reference value, when the road section is a curvature changing section in which a rate of change in a curvature of the road is greater than or equal to a certain value.

In the vehicle control system according to the aspect of the present disclosure, the electronic control unit may be configured to apply, to traveling of the vehicle, a vehicle operating characteristic that decreases a head-turning property of the vehicle from a reference value and increases steering reaction force from a reference value, when the road section is a curvature changing section or a narrow-width section in which a road width is less than or equal to a certain value.

In the vehicle control system according to the aspect of the present disclosure, the electronic control unit may be configured to apply, to traveling of the vehicle, a vehicle operating characteristic that increases steering reaction force from a reference value and decreases acceleration response from a reference value, when the road section is a rough section in which a road surface roughness degree is greater than or equal to a certain value.

The vehicle control system according to the aspect of the present disclosure may further include a GPS receiver is configured to receive a signal from a global positioning sensor and measure a position of the vehicle based on the received signal. The electronic control unit may be configured to recognize the position of the vehicle on the map based on the measured position information of the vehicle from the GPS receiver and the map information from the map database.

As described heretofore, according to the aspect of the present disclosure, traveling of a vehicle can be controlled in accordance with the actual road environment.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a block diagram illustrating a vehicle control system according to a third embodiment;

FIG. 7A is a flowchart illustrating a vehicle operating characteristic specification process; and FIG. 7B is a flowchart illustrating a vehicle operating characteristic application process.

DETAILED DESCRIPTION OF EMBODIMENTS

Hereinafter, embodiments of the present disclosure will be described with reference to the drawings.

First Embodiment

Figure 1:
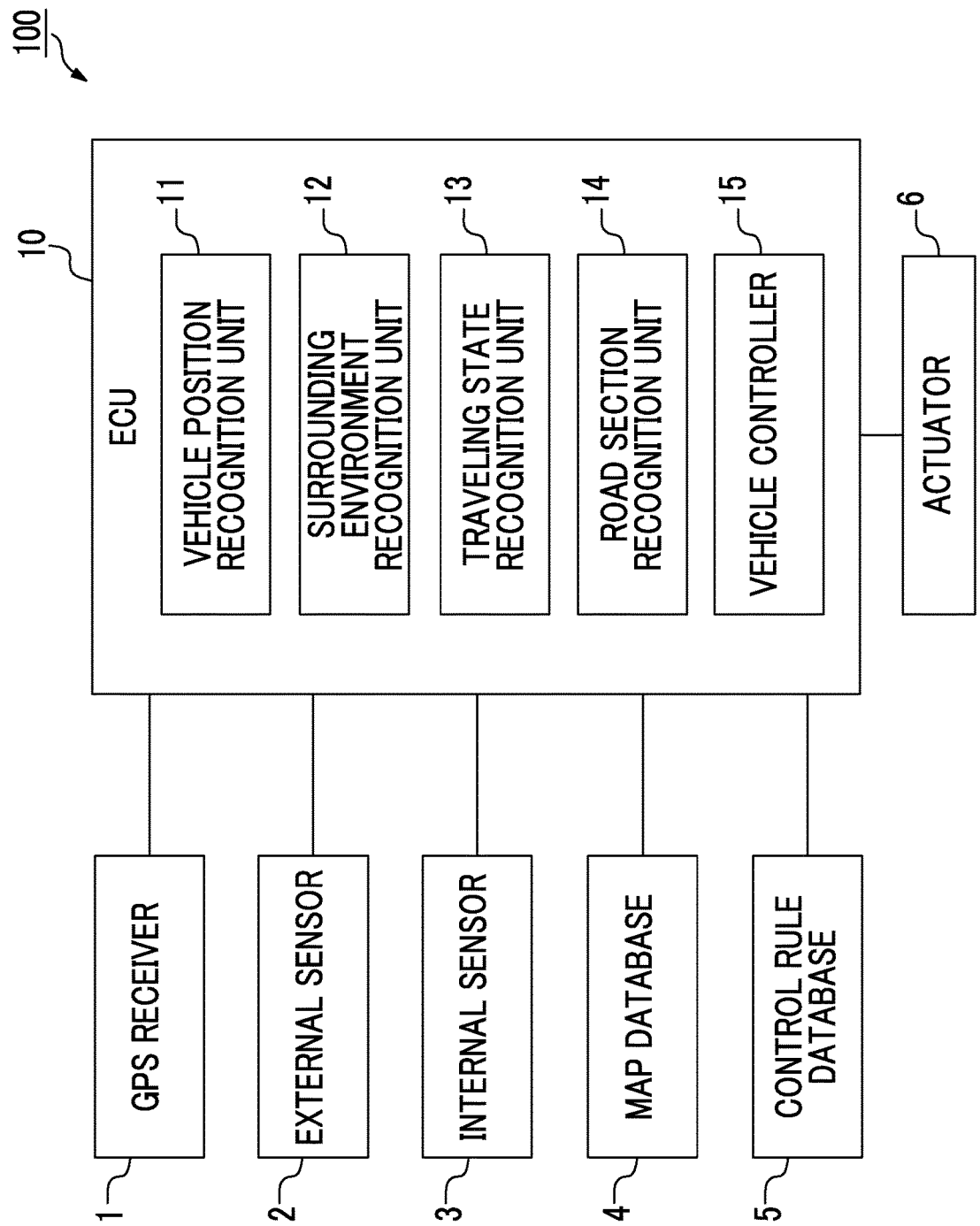
FIG. 1 is a block diagram illustrating a vehicle control system according to a first embodiment.

FIG. 1 is a block diagram illustrating a vehicle control system according to a first embodiment. A vehicle control system 100 illustrated in FIG. 1 is mounted in a vehicle such as a passenger car, and controls traveling of the vehicle based on a detection result of a vehicle-mounted sensor. Control of traveling of the vehicle includes autonomous driving control and driving assistance control. The autonomous driving control is vehicle control that causes the vehicle to automatically travel along a target route. In the autonomous driving control, a driver does not need to perform a driving operation, and the vehicle travels automatically. The driving assistance control is vehicle control that assists the driver in driving the vehicle.

Configuration of Vehicle Control System According to First Embodiment

As illustrated in FIG. 1, the vehicle control system 100 according to the first embodiment includes an electronic control unit (ECU) 10 that manages the overall system. The ECU 10 is an electronic control unit that has a central processing unit (CPU), a read-only memory (ROM), a random access memory (RAM), a controller area network (CAN) communication circuit, and the like. In the ECU 10, various operations are realized by, for example, loading a program stored in the ROM into the RAM and executing, by the CPU, the program loaded into the RAM. The ECU 10 may be configured with a plurality of electronic units.

The ECU 10 is connected with a GPS receiver 1, an external sensor 2, an internal sensor 3, a map database 4, a control rule database 5, and an actuator 6. The external sensor 2 and the internal sensor 3 constitute the vehicle-mounted sensor.

The GPS receiver 1 measures the position of the vehicle (for example, the latitude and the longitude of the vehicle) by receiving signals from three or more global positioning system (GPS) satellites. The GPS receiver 1 transmits the measured position information of the vehicle to the ECU 10.

The external sensor 2 is a detector that detects a circumstance in the proximity of the vehicle. The external sensor 2 includes at least one of a camera and a radar sensor.

The camera is a capturing device that captures the circumstance outside the vehicle. The camera is disposed on the rear side of a windshield of the vehicle. The camera transmits the captured information related to the circumstance outside the vehicle to the ECU 10. The camera may be a monocular camera or a stereo camera. The stereo camera has two capturing units that are disposed to reproduce binocular disparity. Captured information of the stereo camera includes depthwise information.

The radar sensor is a detector that detects an obstacle in the proximity of the vehicle by using an electric wave (for example, a millimeter wave) or light. The radar sensor includes, for example, a millimeter wave radar or light detection and ranging (LIDAR). The radar sensor detects the obstacle by transmitting an electric wave or light to the proximity of the vehicle and receiving an electric wave or light reflected by the obstacle. The radar sensor transmits the detected obstacle information to the ECU 10. The obstacle is a fixed obstacle such as a guardrail and a building, or a moving obstacle such as a pedestrian, a bicycle, and another vehicle.

The internal sensor 3 is a detector for detecting the traveling state of the vehicle. The internal sensor 3 includes a vehicle speed sensor, an acceleration sensor, and a yaw rate sensor. The vehicle speed sensor is a detector that detects the speed of the vehicle. For example, a wheel speed sensor that is disposed in a wheel or a driveshaft or the like of the vehicle rotating with the –wheel as a single body and detects the rotational speed of the wheel is used as the vehicle speed sensor. The vehicle speed sensor transmits the detected vehicle speed information (wheel speed information) to the ECU 10.

The acceleration sensor is a detector that detects the acceleration of the vehicle. The acceleration sensor includes, for example, a front-rear acceleration sensor that detects the acceleration of the vehicle in the front-rear direction, and a lateral acceleration sensor that detects the lateral acceleration of the vehicle. The acceleration sensor transmits, for example, the acceleration information of the vehicle to the ECU 10. The yaw rate sensor is a detector that detects the yaw rate (rotational angular velocity) of the vehicle about the vertical axis at the center of gravity of the vehicle. For example, a gyrosensor can be used as the yaw rate sensor. The yaw rate sensor transmits the detected yaw rate information of the vehicle to the ECU 10.

The map database 4 is a database that stores map information. The map database 4 is formed within, for example, a hard disk drive (HDD) that is mounted in the vehicle. The map information includes the position information of a road, information as to a road shape (for example, types including a curve and a linear part, and the curvature of a curve), the position information of an intersection and a branch, the position information of a structure, and the like. The map information may include information as to a road surface roughness degree. The map information also includes traffic regulation information such as a speed limit associated with the position information. The map information also includes facility data including the position of facilities and types of facilities (types such as a school, a hospital, a station, and a convenience store). The map database 4 may be stored in a computer in a facility such as a management center that can communicate with the vehicle.

The control rule database 5 is a database that stores control rule data. The control rule data is data in which one of a plurality of control rules set in advance is associated with each road section set in advance on the map. The road section is a section that is set in the road on the map. In the control rule database 5, the road section set in advance on the map is stored in association with the map information of the map database 4.

The road section includes, for example, a narrow-width section in which the road width is less than or equal to a certain value, a curve entrance section that includes the entrance of a curve, a curve exit section that includes the exit of a curve, and a rough section in which the road surface roughness degree is higher than or equal to a certain value. The road section does not need to be continuously set and may not be contiguously set. The road section also includes a section having a plurality of characteristics (a curve entrance section in which the road width is less than or equal to a certain value, or the like). The control rule is a rule that is used in control of traveling of the vehicle in the associated road section. The control rule will be described in detail below.

The control rule database 5 may be stored in a computer in a facility such as a management center that can communicate with the vehicle. The control rule database 5 may be integrated with the map database 4. The control rule data may be retained in the ECU 10.

The actuator 6 is a device that is used in control of the vehicle. The actuator 6 includes at least a throttle actuator, a brake actuator, and a steering actuator. The throttle actuator controls the amount of air supplied to an engine (throttle opening degree) in accordance with a control signal from the ECU 10, and controls the drive power of the vehicle. When the vehicle is a hybrid vehicle, the drive power is also controlled in addition to the amount of air supplied to the engine, by inputting a control signal from the ECU 10 into a motor as a power source. When the vehicle is an electric vehicle, the drive power is controlled by inputting a control signal from the ECU 10 into a motor as a power source. The motor as a power source constitutes the actuator 6.

The brake actuator controls a brake system in accordance with a control signal from the ECU 10, and controls braking power applied to the wheel of the vehicle. For example, a hydraulic brake system can be used as the brake system. The steering actuator controls driving of an assist motor of an electric power steering system in accordance with a control signal from the ECU 10. The assist motor controls steering torque. Accordingly, the steering actuator controls the steering torque of the vehicle.

Next, a configuration of the ECU 10 will be described. The ECU 10 has a vehicle position recognition unit 11, a surrounding environment recognition unit 12, a traveling state recognition unit 13, a road section recognition unit 14, and a vehicle controller 15. A part of the ECU 10 described below may be executed in a server in a facility such as a management center that can communicate with the vehicle.

The vehicle position recognition unit 11 recognizes the position of the vehicle on the map based on the position information of the GPS receiver 1 and the map information of the map database 4. The vehicle position recognition unit 11 recognizes the position of the vehicle by simultaneous localization and mapping (SLAM) technology using the position information of a fixed obstacle such as a power pole included in the map information of the map database 4 and the detection result of the external sensor 2. The vehicle position recognition unit 11 may recognize the position of the vehicle on the map by a well-known technique.

The vehicle position recognition unit 11 also recognizes the lateral position of the vehicle. The lateral position of the vehicle is the position of the vehicle in the width direction of the road on which the vehicle travels. The vehicle position recognition unit 11 recognizes the lateral position of the vehicle by recognizing a white line of the road on which the vehicle travels, based on the detection result of the external sensor 2 (for example, the captured information of the camera). The vehicle position recognition unit 11 may recognize the lateral position of the vehicle by a well-known technique.

The surrounding environment recognition unit 12 recognizes the surrounding environment of the vehicle based on the detection result of the external sensor 2. The surrounding environment includes the position of an obstacle with respect to the vehicle, the relative speed of an obstacle with respect to the vehicle, the movement direction of an obstacle with respect to the vehicle, and the like. The surrounding environment recognition unit 12 recognizes the surrounding environment of the vehicle by a well-known technique based on the captured image of the camera and the obstacle information of the radar sensor.

The traveling state recognition unit 13 recognizes the traveling state of the vehicle based on the detection result of the internal sensor 3. The traveling state includes the vehicle speed of the vehicle, the acceleration of the vehicle, and the yaw rate of the vehicle. Specifically, the traveling state recognition unit 13 recognizes the vehicle speed of the vehicle based on the vehicle speed information of the vehicle speed sensor. The traveling state recognition unit 13 recognizes the acceleration of the vehicle based on the vehicle speed information of the acceleration sensor. The traveling state recognition unit 13 recognizes the direction of the vehicle based on the yaw rate information of the yaw rate sensor.

The road section recognition unit 14 recognizes a road section in the traveling direction of the vehicle based on the map information of the map database 4, the control rule data of the control rule database 5, and the position of the vehicle on the map recognized by the vehicle position recognition unit 11. The road section recognition unit 14 recognizes a road section in the traveling direction of the vehicle among road sections set in advance on the map. The road section recognition unit 14 recognizes, for example, a road section positioned in the traveling direction of the vehicle in the traveling road on which the vehicle travels.

When a target route of the vehicle is set in advance in order to guide the driver with the autonomous driving control or a well-known navigation system, the road section recognition unit 14 may recognize a road section on the target route based on the target route, the map information, the control rule data, and the position of the vehicle on the map. The road section recognition unit 14 may recognize a plurality of road sections at once.

When the road section recognition unit 14 recognizes a road section in the traveling direction of the vehicle, the vehicle controller 15 specifies the control rule associated with the road section, based on the road section recognized by the road section recognition unit 14 and the control rule data of the control rule database 5.

When the vehicle controller 15 specifies the control rule, the road section recognition unit 14 determines whether or not the vehicle enters the recognized road section. The vehicle controller 15 determines whether or not the vehicle enters the road section, based on the map information of the map database 4, the position of the vehicle on the map recognized by the vehicle position recognition unit 11, and the road section recognized by the road section recognition unit 14.

When the vehicle controller 15 determines that the vehicle enters the road section, the vehicle controller 15 controls traveling of the vehicle in the road section by using the control rule associated with the road section. The vehicle controller 15 controls traveling of the vehicle by using the control rule based on the map information of the map database 4, the control rule data of the control rule database 5, the position of the vehicle on the map recognized by the vehicle position recognition unit 11, the surrounding environment recognized by the surrounding environment recognition unit 12, and the traveling state recognized by the traveling state recognition unit 13.

Specifically, the vehicle controller 15, for example, before the vehicle enters the road section, calculates a target vehicle traveling trajectory and a target traveling state in the road section in the traveling direction of the vehicle based on the map information and the position of the vehicle on the map. The target vehicle traveling trajectory is a trajectory that is a control target for traveling of the vehicle. The target traveling state is a traveling state (for example, an acceleration, a yaw rate, and a vehicle speed) that is a control target for traveling of the vehicle when the vehicle is traveling on the target traveling trajectory. The vehicle controller 15 calculates the target vehicle traveling trajectory and the target traveling state by a well-known technique.

When the vehicle controller 15 determines that the vehicle enters the road section, the vehicle controller 15 controls traveling of the vehicle in the road section based on the map information, the position of the vehicle on the map, the surrounding environment, the traveling state, and the target vehicle traveling trajectory. The vehicle controller 15 controls traveling of the vehicle by transmitting a control signal to the actuator 6.

Hereinafter, control of traveling of the vehicle with the control rule corresponding to the road section will be specifically described. First, an example of calculation of a target steering angle and a target acceleration of the vehicle used in control of traveling of the vehicle will be described. The vehicle controller 15 calculates a target steering angle $D_{latral}(t)$ of the vehicle at time t and a target acceleration $A_{longitudal}(t)$ of the vehicle at time t by using, for example, General Formula (1) and General Formula (2).

$$D_{latral}(t) = K_{cur}C_p(t) + K_{\Delta cur}\Delta C_p(t) + \\ K_{slant}S_p(t) + K_{error}E_p(t) + K_{\Delta error}\Delta E_p(t) + \\ K_{yaw}\theta_p(t) + K_{yawrate}r_p(t) + \int KI_{error}E_p(t)dt + \\ \int KI_{yaw}\theta_p(t)dt + \int KI_{yawrate}r_p(t)dt$$

General Formula (1)

$$A_{longitudal}(t) = K_{grad}G_p(t) + K_{acc}A_p(t) + \\ K_{velocity}V_p(t) + K_{distance}D_p(t) + \int KI_{acc}A_p(t)dt + \\ \int KI_{velocity}V_p(t)dt + \int KI_{distance}D_p(t)dt$$

General Formula (2)

In General Formula (1), the curvature of the target vehicle traveling trajectory at time t is denoted by $C_p(t)$. The rate of change in the curvature of the target vehicle traveling trajectory at time t is denoted by $\Delta C_p(t)$. The lateral gradient of the target vehicle traveling trajectory at time t is denoted by $S_p(t)$. The vehicle controller 15 can acquire $C_p(t)$, $\Delta C_p(t)$, and $S_p(t)$ from the map information and the target vehicle traveling trajectory.

A lateral position offset between the target vehicle traveling trajectory and the vehicle at time t is denoted by $E_p(t)$. The rate of change in the lateral position offset between the target vehicle traveling trajectory and the actual vehicle at time t is denoted by $\Delta E_p(t)$. The vehicle controller 15 can acquire $E_p(t)$ and $\Delta E_p(t)$ from the position of the vehicle on the map and the lateral position of the vehicle recognized by the vehicle position recognition unit 11 and the target vehicle traveling trajectory.

An attitude angle offset between the target vehicle traveling trajectory and the vehicle at time t is denoted by $\theta_p(t)$. An error between a target yaw rate and the yaw rate of the vehicle is denoted by $r_p$. A front-rear gradient of the target vehicle traveling trajectory at time t is denoted by $G_p(t)$. An error between a target front-rear acceleration and the acceleration (front-rear acceleration) of the vehicle at time t is denoted by $A_p(t)$. An error between a target front-rear vehicle speed and the vehicle speed of the vehicle at time t is denoted by $V_p(t)$. An error between a target front-rear position and the front-rear position of the vehicle at time t is denoted by $D_p(t)$. The target front-rear position is a control target position of the vehicle in the extending direction of the target vehicle traveling trajectory. The vehicle controller 15 can acquire $\theta_p(t)$, $r_p(t)$, $G_p(t)$, $A_p(t)$, $V_p(t)$, and $D_p(t)$ from the traveling state recognized by the traveling state recognition unit 13, the position of the vehicle on the map recognized by the vehicle position recognition unit 11, and the target traveling state.

In General Formula (1), K and KI are control gains. A reference value set in advance is used as K and KI. The values of K and KI are changed in accordance with the control rule. A control gain of $C_p(t)$ is denoted by $K_{cur}$. A control gain of $\Delta C_p(t)$ is denoted by $K_{\Delta cur}$. A control gain of $S_p(t)$ is denoted by $K_{slant}$. A control gain of $E_p(t)$ is denoted by $K_{error}$. A control gain of $\Delta E_p(t)$ is denoted by $K_{\Delta error}$. A control gain of $\theta_p(t)$ is denoted by $K_{yaw}$. A control gain of $r_p(t)$ is denoted by $K_{yawrate}$. A control gain of a time derivative of $E_p(t)$ is denoted by $KI_{error}$. A control gain of a time derivative of $\theta_p(t)$ is denoted by $KI_{yaw}$. A control gain of $G_p(t)$ is denoted by $K_{grad}$. A control gain of $A_p(t)$ is denoted by $K_{acc}$. A control gain of $V_p(t)$ is denoted by $K_{velocity}$. A control gain of $D_p(t)$ is denoted by $K_{distance}$. A control gain of a time derivative of $A_p(t)$ is denoted by $KI_{acc}$. A control gain of a time derivative of $V_p(t)$ is denoted by $KI_{velocity}$. A control gain of a time derivative of $D_p(t)$ is denoted by $KI_{distance}$.

The vehicle controller 15 controls traveling of the vehicle at time t based on the target steering angle $D_{latral}(t)$ of the vehicle calculated from General Formula (1) and the target acceleration $A_{longitudal}(t)$ calculated from General Formula (2).

Figure 2A:
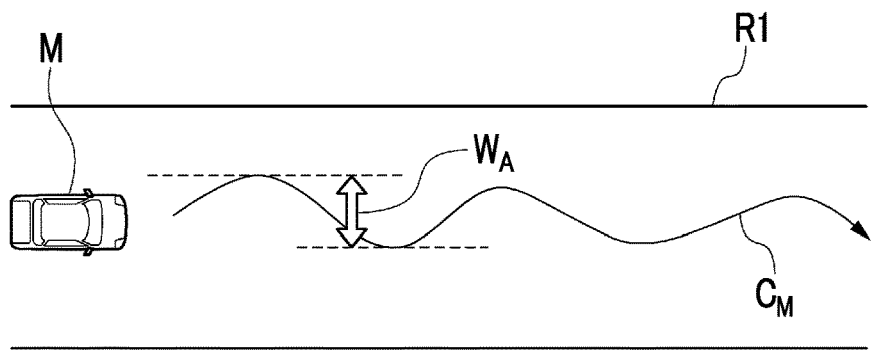
FIG. 2A is a plan view for describing control of traveling of a vehicle in a narrow-width section having a narrow road width.

FIG. 2A is a plan view for describing control of traveling of a vehicle M in a narrow-width section having a narrow road width. FIG. 2A illustrates a narrow-width section R1, the vehicle M, a course $C_M$ of the vehicle M, and a meander width $W_A$ of the course $C_M$. The narrow-width section R1 is a linear road section that does not have a roadside and has a road width less than or equal to a certain value on the map.

In the narrow-width section R1 illustrated in FIG. 2A, the vehicle controller 15 controls traveling of the vehicle M by using a first control rule. The first control rule is a control rule for setting the meander width $W_A$ of a lateral motion of the vehicle M to be less than or equal to a designed value (predetermined value) in the narrow-width section R1. Specifically, in the first control rule, the control gain $K_{error}$, the control gain $K_{\Delta error}$, and the control gain $KI_{error}$ are increased from the reference value in General Formula (1) and General Formula (2).

Figure 2B:
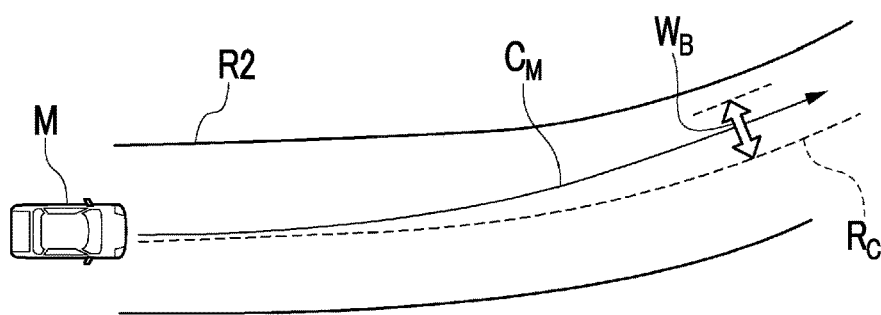
FIG. 2B is a plan view for describing control of traveling of the vehicle in a curve entrance section including the entrance of a curve.

FIG. 2B is a plan view for describing control of traveling of the vehicle M in a curve entrance section including the entrance of a curve. FIG. 2B illustrates a curve entrance section R2, an imaginary center line $R_C$ indicating the center of the road (the center of a lane), and a difference $W_B$ between the imaginary center line $R_C$ and the course $C_M$ of the vehicle M in the road width direction at the entrance of the curve. The curve entrance section R2 is a road section that includes the entrance of a curve in which the curvature of the road is greater than or equal to a certain value. The entrance of a curve is, for example, a location in which the curvature of the road less than the certain value becomes greater than or equal to the certain value. The curve entrance section R2 may be limited to a section in which the rate of change in curvature in front of and behind the entrance of a curve is greater than or equal to a certain value (a section in which the rate of change in curvature is significantly increased).

In the curve entrance section R2 illustrated in FIG. 2B, the vehicle controller 15 controls traveling of the vehicle M by using a second control rule. The second control rule is a control rule for setting the difference $W_B$ between the course $C_M$ of the vehicle M and the imaginary center line $R_C$ in the road width direction in the curve entrance section R2 to be less than or equal to a designed value (certain value). Specifically, in the second control rule, the control gain $K_{\Delta cur}$ is increased from the reference value, and the control gain $K_{slant}$ is decreased from the reference value in General Formula (1) and General Formula (2).

Figure 2C:
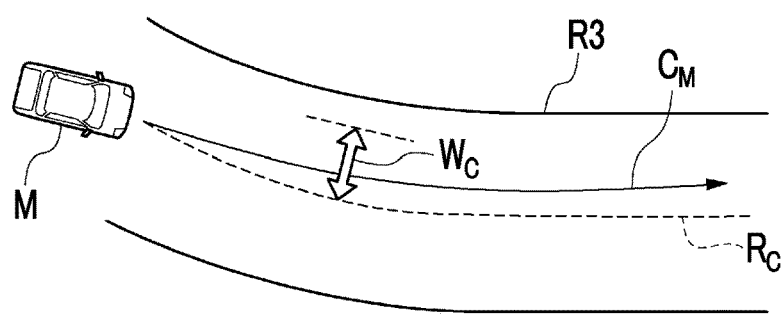
FIG. 2C is a plan view for describing control of traveling of the vehicle in a curve exit section including the exit of a curve.

FIG. 2C is a plan view for describing control of traveling of the vehicle M in a curve exit section including the exit of a curve. FIG. 2C illustrates a curve exit section R3, and a difference $W_C$ between the imaginary center line $R_C$ and the course $C_M$ of the vehicle M in the road width direction at the exit of the curve. The curve exit section R3 is a road section that includes the exit of a curve in which the curvature of the road is greater than or equal to a certain value. The exit of a curve is, for example, a location in which the curvature of the road greater than or equal to the certain value becomes less than or equal to the certain value. The curve exit section R3 may be limited to a section in which the rate of change in curvature in front of and behind the exit of a curve is greater than or equal to a certain value (a section in which the rate of change in curvature is significantly decreased).

In the curve exit section R3 illustrated in FIG. 2C, the vehicle controller 15 controls traveling of the vehicle M by using a third control rule. The third control rule is a control rule for setting the difference $W_C$ between the course $C_M$ of the vehicle M and the imaginary center line $R_C$ in the road width direction in the curve exit section R3 to be less than or equal to a designed value (certain value). Specifically, in the third control rule, the control gain $K_{\Delta cur}$ and the control gain $K_{slant}$ are decreased from the reference value in General Formula (1) and General Formula (2).

Figure 2D:
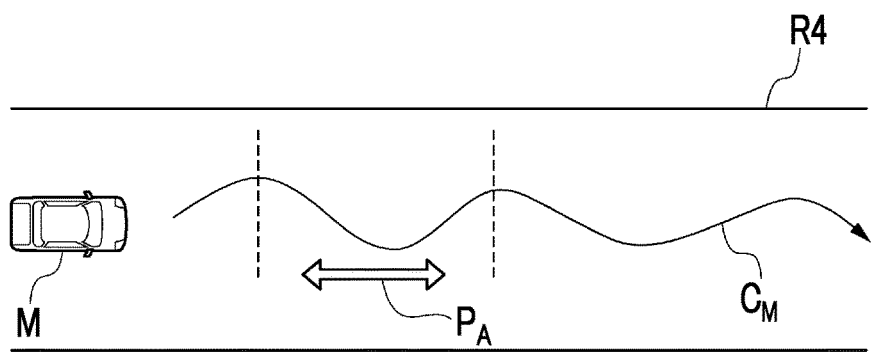
FIG. 2D is a plan view for describing control of traveling of the vehicle in a rough section in which the roughness degree of a road surface is comparatively high.

FIG. 2D is a plan view for describing control of traveling of the vehicle M in a rough section in which the roughness degree of a road surface is comparatively high. FIG. 2D illustrates a rough section R4 and a meander frequency $P_A$ of the course $C_M$ of the vehicle M. The rough section R4 is a road section in which the road surface roughness degree is higher than or equal to a certain value (a road section having a high road surface roughness degree). The rough section R4 may be limited to a road section in which the road width is less than or equal to a certain value.

In the rough section R4 illustrated in FIG. 2D, the vehicle controller 15 controls traveling of the vehicle M by using a fourth control rule. The fourth control rule is a control rule for setting the meander frequency $P_A$ of lateral motions of the vehicle M to be less than or equal to a designed value (predetermined value) in the rough section R4. Specifically, in the fourth control rule, the control gain $K_{error}$ and the control gain $KI_{error}$ are decreased from the reference value, and the control gain $K_{\Delta error}$ and the control gain $K_{yaw}$ are increased from the reference value in General Formula (1) and General Formula (2).

Processes of Vehicle Control System According to First Embodiment

Control Rule Specification Process

Figure 3B:
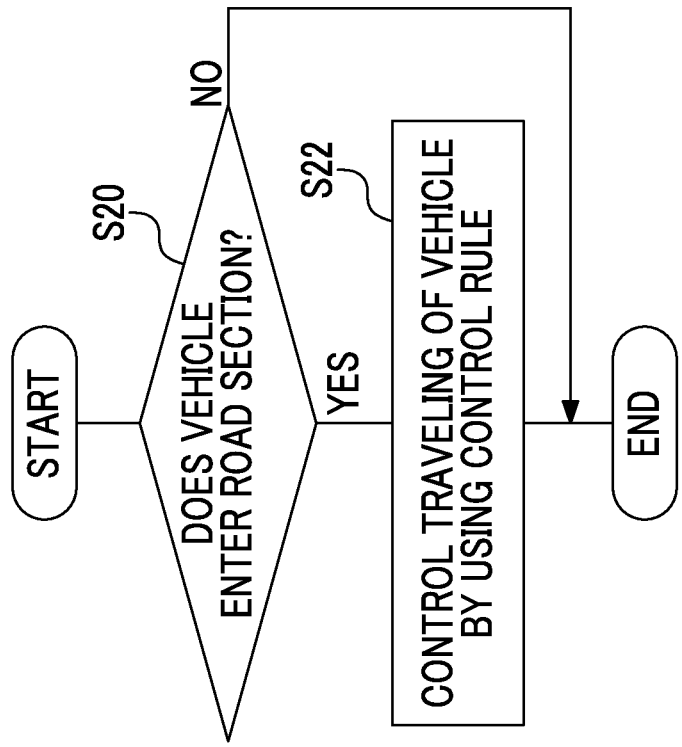
FIG. 3B is a flowchart illustrating vehicle traveling control.
Figure 3A:
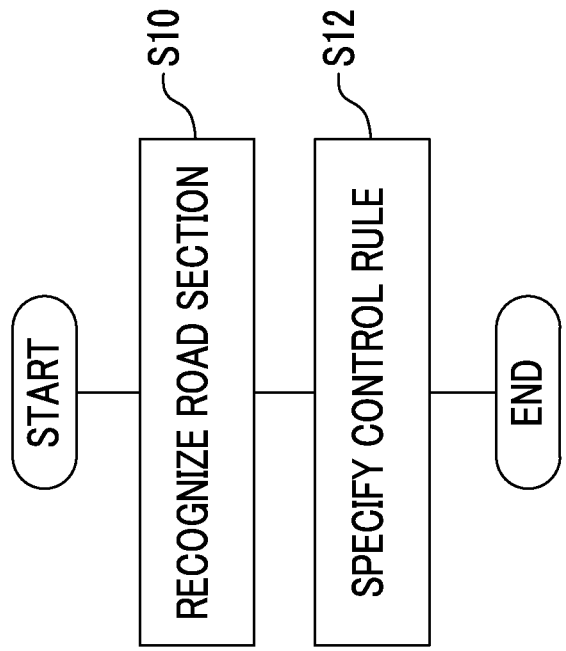
FIG. 3A is a flowchart illustrating a control rule specification process.

Next, a process of the vehicle control system 100 according to the first embodiment will be described. FIG. 3A is a flowchart illustrating a control rule specification process. The flowchart illustrated in FIG. 3A is executed during, for example, traveling of the vehicle.

As illustrated in FIG. 3A, as S10, the ECU 10 of the vehicle control system 100 recognizes a road section in the traveling direction of the vehicle by the road section recognition unit 14. The road section recognition unit 14 recognizes a road section in the traveling direction of the vehicle based on the map information of the map database 4, the control rule data of the control rule database 5, and the position of the vehicle on the map recognized by the vehicle position recognition unit 11.

In S12, the ECU 10 specifies the control rule associated with the road section, by the vehicle controller 15. The vehicle controller 15 specifies the control rule associated with the road section, based on the road section recognized by the road section recognition unit 14 and the control rule data of the control rule database 5. Then, the ECU 10 finishes the current control rule specification process. The control rule specification process is executed a number of times corresponding to the number of road sections in the traveling direction of the vehicle recognized by the road section recognition unit 14.

Vehicle Traveling Control

Next, vehicle traveling control of the vehicle control system 100 according to the first embodiment will be described. FIG. 3B is a flowchart illustrating the vehicle traveling control. The flowchart illustrated in FIG. 3B is executed during control of traveling of the vehicle after, for example, at least one control rule is specified in the control rule specification process in FIG. 3A.

As illustrated in FIG. 3B, as S20, the ECU 10 determines whether or not the vehicle enters the road section, by the vehicle controller 15. The vehicle controller 15 performs the determination based on the map information of the map database 4, the control rule data of the control rule database 5, the position of the vehicle on the map recognized by the vehicle position recognition unit 11, and the road section recognized by the road section recognition unit 14. When the vehicle controller 15 does not determine that the vehicle enters the road section (NO in S20), the ECU 10 finishes the current vehicle traveling control process. Then, the ECU 10 repeats processing again from S20 after elapse of a certain time period. When the vehicle controller 15 determines that the vehicle enters the road section (YES in S20), the ECU 10 transitions to S22.

In S22, the ECU 10 controls traveling of the vehicle by using the control rule, by the vehicle controller 15. The vehicle controller 15 controls traveling of the vehicle by using the control rule based on the map information of the map database 4, the control rule data of the control rule database 5, the position of the vehicle on the map recognized by the vehicle position recognition unit 11, the surrounding environment recognized by the surrounding environment recognition unit 12, and the traveling state recognized by the traveling state recognition unit 13. The vehicle controller 15 controls traveling of the vehicle by transmitting a control signal to the actuator 6. Then, the ECU 10 finishes the current vehicle traveling control process.

Effect of Vehicle Control System According to First Embodiment

The vehicle control system 100 according to the first embodiment described heretofore stores an appropriate control rule in association with each road section on the map, and can control traveling of the vehicle with the stored control rule when the vehicle travels in the road section. Thus, the vehicle can be controlled with an appropriate control rule corresponding to the actual road environment, compared to a system in the related art that uniformly changes a control value based on a part of parameters such as an altitude or a gradient in the map information. Accordingly, by controlling the vehicle with an appropriate control technique corresponding to the actual road environment, the vehicle control system 100 can improve the stability of traveling of the vehicle and ride quality.

Second Embodiment

Figure 4:
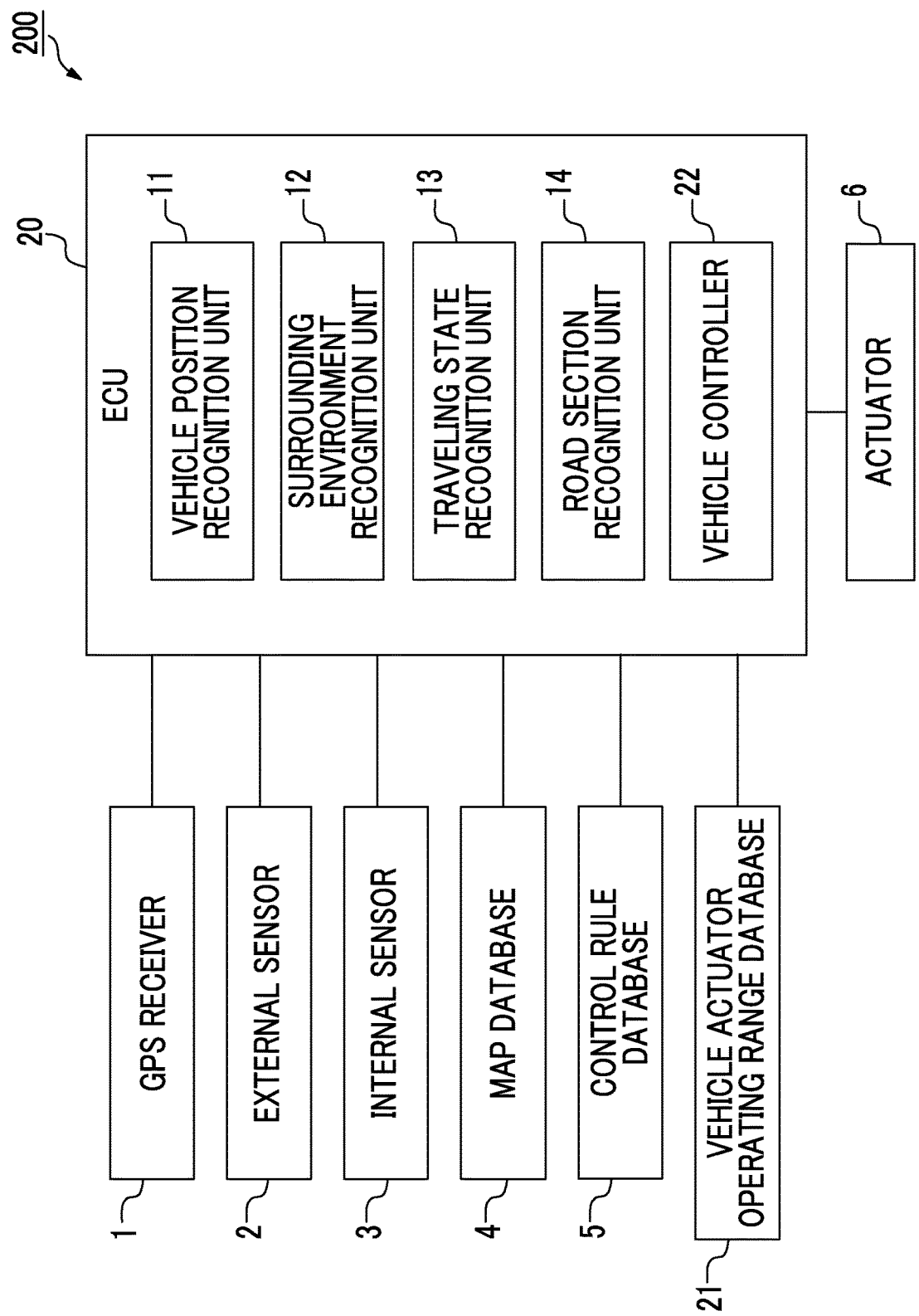
FIG. 4 is a block diagram illustrating a vehicle control system according to a second embodiment.

Next, a vehicle control system according to a second embodiment will be described with reference to FIG. 4. FIG. 4 is a block diagram illustrating a vehicle control system 200 according to the second embodiment. The vehicle control system 200 illustrated in FIG. 4 is different from the first embodiment in that a vehicle actuator operating range is changed in accordance with the road section.

Specifically, the vehicle control system 200 according to the second embodiment is different from the first embodiment in that an ECU 20 is connected with a vehicle actuator operating range database 21, and that the operation of a vehicle controller 22 is different. The same or corresponding constituent elements as in the first embodiment will be designated with the same reference signs and will not be described.

The vehicle actuator operating range database 21 illustrated in FIG. 4 is a database that stores operating range data. The operating range data is data in which one of a plurality of vehicle actuator operating ranges set in advance is associated with each road section set in advance on the map. The vehicle actuator operating range is the operating range of the actuator 6 that is allowed in relation to control of traveling of the vehicle. The vehicle actuator operating range includes the operating range of the throttle actuator, the operating range of the brake actuator, and the operating range of the steering actuator. The upper limit of the vehicle actuator operating range is referred to as a guard value. A reference value of the guard value is set in advance.

The vehicle actuator operating range database 21 may be stored in a computer in a facility such as a management center that can communicate with the vehicle. The vehicle actuator operating range database 21 may be integrated with the map database 4. The operating range data may be retained in the ECU 20.

When the road section recognition unit 14 recognizes a road section in the traveling direction of the vehicle, the vehicle controller 22 of the ECU 20 according to the second embodiment specifies the vehicle actuator operating range associated with the road section, based on the road section recognized by the road section recognition unit 14 and the operating range data of the vehicle actuator operating range database 21.

The vehicle controller 22 determines whether or not the vehicle enters the road section recognized by the road section recognition unit 14. When the vehicle controller 22 determines that the vehicle enters the road section, the vehicle controller 22 controls traveling of the vehicle in the road section within the range of the vehicle actuator operating range associated with the road section. The vehicle controller 22 controls traveling of the vehicle within the range of the vehicle actuator operating range by using the control rule associated with the road section in the same manner as the first embodiment.

Specifically, in a curvature changing section in which the rate of change in the curvature of the road is greater than or equal to a certain value, the vehicle controller 22 applies a first vehicle actuator operating range in which the guard value of a steering angle in the operating range of the steering actuator is greater than the reference value. Accordingly, the vehicle controller 22 can reduce an excessive increase in the frequency of steering of the vehicle which causes the driver to have a feeling of insecurity, in the curvature changing section in which the rate of change in the curvature of the road is greater than or equal to the certain value.

The vehicle controller 22 may apply a second vehicle actuator operating range in which the guard value of the steering torque, instead of the guard value of the steering angle, in the operating range of the steering actuator is greater than the reference value. The vehicle controller 22 may apply a third vehicle actuator operating range in which both the guard value of the steering angle and the guard value of the steering torque are greater than the reference value.

In a road section that has the curvature of the road greater than or equal to a certain value and the rate of change in curvature greater than or equal to a certain value, and has a wall (or a barricade) set on a side of the road, the vehicle controller 22 may apply a fourth vehicle actuator operating range in which the guard value of the drive power in the operating range of the throttle actuator is less than the reference value. Accordingly, the vehicle controller 22 can reduce an increase in the drive power of the vehicle which causes the driver to have a feeling of insecurity, in a section in which the vehicle travels at a close distance to the wall at a sharp curve having the rate of change in the curvature of the road greater than or equal to a certain value.

In a merging section in which a plurality of lanes merges, or in a branch section in which a lane in which the vehicle travels branches into a plurality of lanes, the vehicle controller 22 may apply a fifth vehicle actuator operating range in which the guard value of the steering angle, the guard value of the steering torque, and the guard value of the drive power are greater than the reference value. Accordingly, the vehicle controller 22 can reduce allowing a quick behavioral change in vehicle which gives the driver a feeling of insecurity, in the merging section or the branch section that is likely to cause a circumstance in which the behavior of the vehicle needs to be changed in a short time period.

Processes of Vehicle Control System According to Second Embodiment

Vehicle Actuator Operating Range Specification Process

Figure 5B:
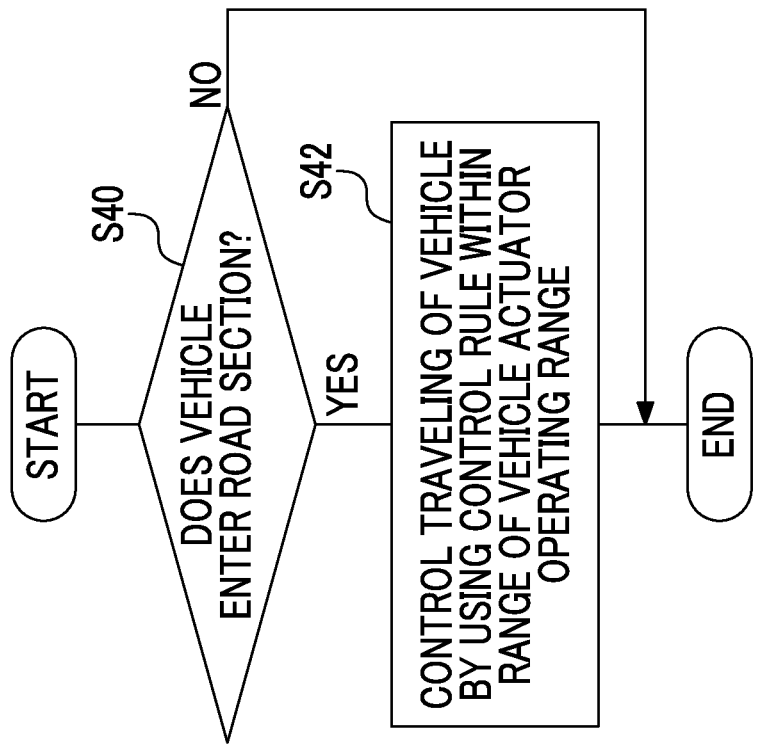
FIG. 5B is a flowchart illustrating vehicle traveling control.
Figure 5A:
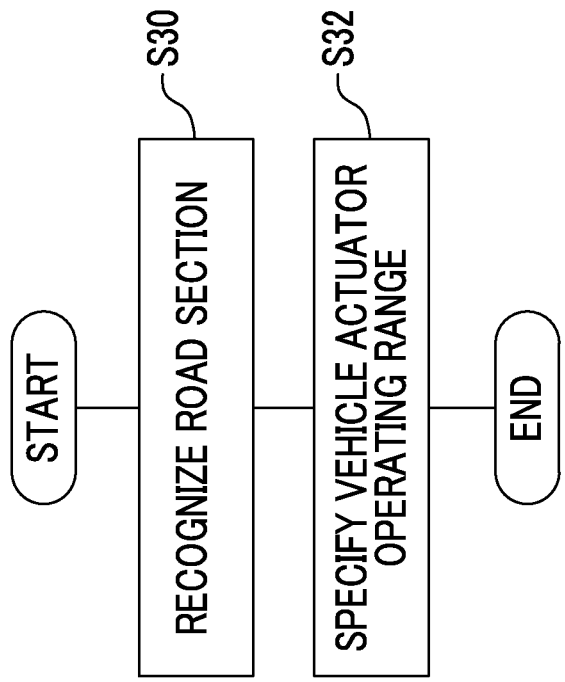
FIG. 5A is a flowchart illustrating a vehicle actuator operating range specification process.

Hereinafter, a process of the vehicle control system 200 according to the second embodiment will be described. FIG. 5A is a flowchart illustrating a vehicle actuator operating range specification process. The flowchart illustrated in FIG. 5A is executed during, for example, traveling of the vehicle.

As illustrated in FIG. 5A, as S30, the ECU 20 of the vehicle control system 200 recognizes a road section in the traveling direction of the vehicle by the road section recognition unit 14.

In S32, the ECU 20 specifies the vehicle actuator operating range associated with the road section, by the vehicle controller 22. The vehicle controller 22 specifies the vehicle actuator operating range associated with the road section, based on the road section recognized by the road section recognition unit 14 and the operating range data of the vehicle actuator operating range database 21. Then, the ECU 20 finishes the current vehicle actuator operating range specification process. The vehicle actuator operating range specification process is executed a number of times corresponding to the number of road sections in the traveling direction of the vehicle recognized by the road section recognition unit 14.

Vehicle Traveling Control

Next, vehicle traveling control of the vehicle control system 200 according to the second embodiment will be described. FIG. 5B is a flowchart illustrating the vehicle traveling control. The flowchart illustrated in FIG. 5B is executed during control of traveling of the vehicle after, for example, at least one vehicle actuator operating range is specified in the vehicle actuator operating range specification process in FIG. 5A.

As illustrated in FIG. 5B, as S40, the ECU 20 determines whether or not the vehicle enters the road section, by the vehicle controller 22. The road section is the road section recognized by the road section recognition unit 14. When the vehicle controller 22 does not determine that the vehicle enters the road section (NO in S40), the ECU 20 finishes the current vehicle traveling control process. Then, the ECU 20 repeats processing again from S40 after elapse of a certain time period. When the vehicle controller 22 determines that the vehicle enters the road section (YES in S40), the ECU 20 transitions to S42.

In S42, the ECU 20 controls traveling of the vehicle within the range of the vehicle actuator operating range by the vehicle controller 22. The vehicle controller 22 controls traveling of the vehicle in the road section within the vehicle actuator operating range associated with the road section.

The vehicle controller 22 controls traveling of the vehicle within the range of the vehicle actuator operating range by using the control rule associated with the road section in the same manner as the first embodiment. The vehicle controller 22 controls traveling of the vehicle by transmitting a control signal to the actuator 6. Then, the ECU 20 finishes the current vehicle traveling control process.

Effect of Vehicle Control System According to Second Embodiment

The vehicle control system 200 according to the second embodiment described heretofore stores an appropriate vehicle actuator operating range in association with each road section on the map, and can control traveling of the vehicle within the stored vehicle actuator operating range when the vehicle travels in the road section. Thus, the vehicle control system 200 can control the vehicle with an appropriate vehicle actuator operating range corresponding to the actual road environment.

Third Embodiment

Next, a vehicle control system according to a third embodiment will be described with reference to FIG. 6. FIG. 6 is a block diagram illustrating a vehicle control system 300 according to the third embodiment. The vehicle control system 300 illustrated in FIG. 6 is different from the second embodiment in that a vehicle operating characteristic is changed in accordance with the road section during a driving operation performed by the driver. The driving operation performed by the driver includes the driving assistance control under which the driver manually performs one of speed adjustment and steering for the vehicle, and the vehicle control system 300 controls the other.

Specifically, the vehicle control system 300 according to the third embodiment is different from the second embodiment in that an ECU 30 is connected with a driving operation detection unit 31 and a vehicle operating characteristic database 32, and that the function of a vehicle controller 33 is different. The same or corresponding constituent elements as in the second embodiment will be designated with the same reference signs and will not be described.

The driving operation detection unit 31 is a device that detects an operation performed on the vehicle by the driver of the vehicle. The driving operation detection unit 31 includes a steering sensor, an accelerator pedal sensor, and a brake pedal sensor. The steering sensor has, for example, a steering torque sensor and a steering touch sensor. The steering torque sensor is disposed in a steering shaft of the vehicle and detects the steering torque applied to a steering wheel by the driver. The steering touch sensor is disposed in the steering wheel of the vehicle and detects the contact of the driver with the steering wheel and the pressure of driver's hold on the steering wheel. The accelerator pedal sensor is disposed in a shaft part of an accelerator pedal and detects the force of stepping or the amount of stepping on the accelerator pedal by the driver (the position of the accelerator pedal). The brake pedal sensor is disposed in a shaft part of a brake pedal and detects the force of stepping or the amount of stepping on the brake pedal by the driver (the position of the brake pedal).

The vehicle operating characteristic database 32 is a database that stores vehicle operating characteristic data. The vehicle operating characteristic data is data in which one of a plurality of vehicle operating characteristics set in advance is associated with each road section set in advance on the map. The vehicle operating characteristic is the operating characteristic of the vehicle at the time of the driving operation performed by the driver.

The vehicle operating characteristic includes the head-turning property of the vehicle, steering reaction force, and acceleration response. The head-turning property of the vehicle is a relationship of a change in tire turning angle with a change in the rotational angle of the steering wheel made by the driver. As the head-turning property of the vehicle is increased, a change in tire turning angle with respect to a change in the rotational angle of the steering wheel is increased. The steering reaction force is the reaction force that is delivered to the driver from the steering wheel in response to a change in the rotational angle of the steering wheel made by the driver. The acceleration response is the responsiveness of a change in the drive power of the vehicle with respect to the amount of stepping on the accelerator pedal by the driver. As the acceleration response is increased, a change in the drive power of the vehicle with respect to the amount of stepping on the accelerator pedal by the driver is increased. Reference values of the head-turning property of the vehicle, the steering reaction force, and the acceleration response are set in advance.

The vehicle operating characteristic database 32 may be stored in a computer in a facility such as a management center that can communicate with the vehicle. The vehicle operating characteristic database 32 may be integrated with the map database 4. The vehicle operating characteristic data may be retained in the ECU 30.

When the road section recognition unit 14 recognizes a road section in the traveling direction of the vehicle, the vehicle controller 33 of the ECU 30 according to the third embodiment specifies the vehicle operating characteristic associated with the road section, based on the road section recognized by the road section recognition unit 14 and the vehicle operating characteristic data of the vehicle operating characteristic database 32.

The vehicle controller 33 determines whether or not the vehicle enters the road section recognized by the road section recognition unit 14. When the vehicle controller 33 determines that the vehicle enters the road section, the vehicle controller 33 determines whether or not the driver is performing a driving operation. The vehicle controller 33 determines whether or not the driver is performing a driving operation, based on, for example, driver's operation detected by the driving operation detection unit 31.

When the vehicle controller 33 determines that the driver is performing a driving operation, the vehicle controller 33 applies the vehicle operating characteristic associated with the road section to traveling of the vehicle in the road section. The vehicle controller 33 applies the vehicle operating characteristic to traveling of the vehicle during the driving operation performed on the vehicle by the driver, based on driver's operation detected by the driving operation detection unit 31 and the specified vehicle operating characteristic. The vehicle controller 33 applies the vehicle operating characteristic to traveling of the vehicle by, for example, transmitting a control signal to the actuator 6.

Specifically, in the curvature changing section in which the rate of change in the curvature of the road is greater than or equal to a certain value, the vehicle controller 33 applies, to traveling of the vehicle, a first vehicle operating characteristic that decreases the head-turning property of the vehicle from the reference value and increases the steering reaction force from the reference value. Accordingly, the vehicle controller 33 can further stabilize traveling of the vehicle performed by a driving operation performed by the driver in the curvature changing section in which the rate of change in the curvature of the road is greater than or equal to a certain value.

In addition to the curvature changing section, even in the narrow-width section in which the road width is less than or equal to a certain value, the vehicle controller 33 may apply, to traveling of the vehicle, the first vehicle operating characteristic that decreases the head-turning property of the vehicle from the reference value and increases the steering reaction force from the reference value. Accordingly, the vehicle controller 33 can further stabilize traveling of the vehicle performed by a driving operation performed by the driver in the narrow-width section.

In the rough section in which the road surface roughness degree is higher than or equal to a certain value, the vehicle controller 33 may apply, to traveling of the vehicle, a second vehicle operating characteristic that increases the steering reaction force from the reference value and decreases the acceleration response from the reference value. Accordingly, the vehicle controller 33 can further stabilize traveling of the vehicle in the rough section even with a high frequency of driving operations performed by the driver.

In the merging section or the branch section, the vehicle controller 33 applies, to traveling of the vehicle, a third vehicle operating characteristic that increases the head-turning property of the vehicle from the reference value, increases the acceleration response from the reference value, and decreases the steering reaction force from the reference value. Accordingly, in the merging section or the branch section in which a quick behavioral change is needed, traveling of the vehicle can be further stabilized even with a high frequency of driving operations performed by the driver.

In the case of the driving assistance control under which the driver manually performs one of speed adjustment and steering for the vehicle, and the vehicle control system 300 controls the other, the vehicle controller 33 may apply the control rule of the first embodiment and the vehicle actuator operating range of the second embodiment to the driving assistance control.

Processes of Vehicle Control System According to Third Embodiment

Vehicle Operating Characteristic Specification Process

Hereinafter, a process of the vehicle control system 300 according to the third embodiment will be described. FIG. 7A is a flowchart illustrating a vehicle operating characteristic specification process. The flowchart illustrated in FIG. 7A is executed during, for example, traveling of the vehicle.

As illustrated in FIG. 7A, as S50, the ECU 30 of the vehicle control system 300 recognizes a road section in the traveling direction of the vehicle by the road section recognition unit 14.

In S52, the ECU 30 specifies the vehicle operating characteristic associated with the road section, by the vehicle controller 33. The vehicle controller 33 specifies the vehicle operating characteristic associated with the road section, based on the road section recognized by the road section recognition unit 14 and the vehicle operating characteristic data of the vehicle operating characteristic database 32. Then, the ECU 30 finishes the current vehicle operating characteristic specification process. The vehicle operating characteristic specification process is executed a number of times corresponding to the number of road sections in the traveling direction of the vehicle recognized by the road section recognition unit 14.

Vehicle Operating Characteristic Application Process

Next, vehicle traveling control of the vehicle control system 300 according to the third embodiment will be described. FIG. 7B is a flowchart illustrating a vehicle operating characteristic application process. The flowchart illustrated in FIG. 7B is executed when, for example, at least one vehicle operating characteristic is specified in the vehicle operating characteristic specification process in FIG. 7A.

As illustrated in FIG. 7B, as S60, the ECU 30 determines whether or not the vehicle enters the road section, by the vehicle controller 33. The road section is the road section recognized by the road section recognition unit 14. When the vehicle controller 33 does not determine that the vehicle enters the road section (NO in S60), the ECU 30 finishes the current vehicle operating characteristic application process. Then, the ECU 30 repeats processing again from S60 after elapse of a certain time period. When the vehicle controller 33 determines that the vehicle enters the road section (YES in S60), the ECU 30 transitions to S62.

In S62, the ECU 30 determines whether or not the driver is performing a driving operation, by the vehicle controller 33. The vehicle controller 33 determines whether or not the driver is performing a driving operation, based on, for example, driver's operation detected by the driving operation detection unit 31. When the vehicle controller 33 determines that the driver is not performing a driving operation (NO in S62), the ECU 30 finishes the current vehicle operating characteristic application process. Then, the ECU 30 repeats processing again from S60 after elapse of a certain time period. When the vehicle controller 33 determines that the driver is performing a driving operation (YES in S62), the ECU 30 transitions to S64.

In S64, the ECU 30 applies the vehicle operating characteristic to traveling of the vehicle in the road section, by the vehicle controller 33. The vehicle controller 33 applies the vehicle operating characteristic to traveling of the vehicle during the driving operation performed on the vehicle by the driver, based on driver's operation detected by the driving operation detection unit 31 and the specified vehicle operating characteristic. Then, the ECU 30 finishes the current vehicle operating characteristic application process.

Effect of Vehicle Control System According to Third Embodiment

The vehicle control system 300 described heretofore stores appropriate vehicle operating characteristic data in association with each road section on the map, and can apply an appropriate vehicle operating characteristic to traveling of the vehicle based on the stored vehicle operating characteristic data, when the vehicle travels in the road section. Thus, the vehicle control system 300 enables the driver to drive the vehicle with an appropriate vehicle operating characteristic corresponding to the actual road environment.

While exemplary embodiments of the present disclosure are described heretofore, the present disclosure is not limited to the embodiments. The present disclosure can be embodied in various forms achieved by carrying out various changes or improvements to the embodiments based on the knowledge of those skilled in the art.

For example, the vehicle control system may specify at least one of the control rule, the vehicle actuator operating range, and the vehicle operating characteristic based on external environment information of the vehicle in addition to the road section. Accordingly, the vehicle control system can specify the optimal control rule, vehicle actuator operating range, or vehicle operating characteristic by considering the external environment information of the vehicle as well.

The external environment information is information related to the external environment (disturbance) that affects traveling of the vehicle. The external environment information can include congestion information in the road section, wind information (information such as a wind speed and the direction of a wind) in the road section, information as to lane regulation in the road section, information as to vehicle speed regulation in the road section, time information such as day, evening, and night, information as to season, specific period information (information such as a period in which strong wind blows frequently, and a period in which cyclone occurs frequently) in the road section, weather information such as rain and snow, and the like. The vehicle control system acquires the external environment information by, for example, wireless network communication or vehicle-to-vehicle communication with another vehicle. The vehicle control system may acquire the external environment information by using a timer of the vehicle, a raindrop sensor of the vehicle, and the like.

Specifically, the control rule database 5 may store a control rule that is associated in advance with a combination of the road section and the external environment information. The vehicle actuator operating range database 21 may store a vehicle actuator operating range that is associated in advance with a combination of the road section and the external environment information. The vehicle operating characteristic database 32 may store a vehicle operating characteristic that is associated in advance with a combination of the road section and the external environment information.

For example, in a road section that has a high possibility of a decrease in the reliability of the external sensor 2 due to backlight in a clear evening, the vehicle control system specifies a vehicle actuator operating range in which the guard value of the steering angle and the guard value of the steering torque in the operating range of the steering actuator are less than the reference value. For example, a circumstance in which side wind having a wind speed higher than or equal to a predetermined threshold occurs may be significantly different from an environment that is assumed at the time of designing calculation of the amount of control (the vehicle speed, the steering angle, and the like) of the vehicle, and the vehicle may behave unexpectedly unstably. Thus, in such a circumstance, the vehicle control system cancels switching the calculation of the control amount that depends on the position information of the vehicle. The vehicle control system may appropriately set the vehicle operating characteristic during a driving operation performed by the driver, based on the road section and the external environment information. A combination of the road section and the external environment information may be appropriately corrected or added when needed.

The vehicle control system may specify at least one of the control rule, the vehicle actuator operating range, and the vehicle operating characteristic based on the vehicle type of the vehicle in addition to the road section. The vehicle control system may specify at least one of the control rule, the vehicle actuator operating range, and the vehicle operating characteristic based on the grade of the vehicle.

What is claimed is:

1. A vehicle control system comprising:
   a vehicle-mounted sensor configured to detect a traveling state of a vehicle and an environment surrounding the vehicle;
   a map database configured to store map information;
   a control rule database configured to store control rule data in which one of a plurality of control rules set in advance is associated with each road section set in advance on a map;
   a vehicle actuator operating range database that stores operating range data in which one of a plurality of vehicle actuator operating ranges set in advance is associated with each road section of the map; and
   an electronic control unit configured to
      recognize a position of the vehicle on the map,
      control traveling of the vehicle by using one of the control rules based on the position of the vehicle on the map, the map information, and a detection result of the vehicle-mounted sensor,
      recognize the road section in a traveling direction of the vehicle based on the position of the vehicle on the map and the map information,
      specify the control rule used in the road section based on the recognized road section and the control rule data, and control traveling of the vehicle in the road section by using the specified control rule; and
      specify the vehicle actuator operating range applied in the road section based on the recognized road section and the operating range data, and control traveling of the vehicle in the road section within a range of the specified vehicle actuator operating range.

2. The vehicle control system according to claim 1, wherein the electronic control unit is configured to apply an operating range in which a guard value of a steering angle in the operating range of a steering actuator is greater than a reference value, when the road section is a curvature changing section in which a rate of change in a curvature of the road is greater than or equal to a certain value.

3. The vehicle control system according to claim 1, wherein the electronic control unit is configured to apply an operating range in which a guard value of drive power in the operating range of a throttle actuator is less than a reference value, when the road section is a road section that has a curvature of the road greater than or equal to a certain value and a rate of change in curvature greater than or equal to a certain value and has a wall set on a side of the road.

4. The vehicle control system according to claim 1, wherein the electronic control unit is configured to apply an operating range in which a guard value of a steering angle, a guard value of steering torque, and a guard value of drive power in the operating range of a steering actuator are greater than a reference value, when the road section is a merging section in which a plurality of lanes merges, or a branch section in which a lane in which the vehicle travels branches into a plurality of lanes.

5. The vehicle control system according to claim 1, further comprising:
   a driving operation detection sensor configured to detect a driving operation performed by a driver of the vehicle; and
   a vehicle operating characteristic database configured to store vehicle operating characteristic data in which one of a plurality of vehicle operating characteristics set in advance is associated with each road section on the map,
   wherein the electronic control unit is configured to specify the vehicle operating characteristic applied in the road section based on the recognized road section and the vehicle operating characteristic data during the driving operation performed on the vehicle by the driver, and apply the vehicle operating characteristic to traveling of the vehicle in the road section during the driving operation performed on the vehicle by the driver.

6. The vehicle control system according to claim 5, wherein the electronic control unit is configured to apply, to traveling of the vehicle, a vehicle operating characteristic that decreases a head-turning property of the vehicle from a reference value and increases steering reaction force from a reference value, when the road section is a curvature changing section in which a rate of change in a curvature of the road is greater than or equal to a certain value.

7. The vehicle control system according to claim 5, wherein the electronic control unit is configured to apply, to traveling of the vehicle, a vehicle operating characteristic that decreases a head-turning property of the vehicle from a reference value and increases steering reaction force from a reference value, when the road section is a curvature changing section or a narrow-width section in which a road width is less than or equal to a certain value.

8. The vehicle control system according to claim 5, wherein the electronic control unit is configured to apply, to traveling of the vehicle, a vehicle operating characteristic that increases steering reaction force from a reference value and decreases acceleration response from a reference value, when the road section is a rough section in which a road surface roughness degree is greater than or equal to a certain value.

9. The vehicle control system according to claim 1, further comprising a GPS receiver is configured to receive a signal from a global positioning sensor and measure the position of the vehicle based on the received signal,
wherein the electronic control unit is configured to recognize the position of the vehicle on the map based on the measured position information of the vehicle from the GPS receiver and the map information from the map database.

10. A vehicle control system comprising:
a vehicle-mounted sensor configured to detect a traveling state of a vehicle and an environment surrounding the vehicle;
a map database configured to store map information;
a control rule database configured to store control rule data in which one of a plurality of control rules set in advance is associated with each road section set in advance on a map; and
an electronic control unit configured to
recognize a position of the vehicle on the map,
control traveling of the vehicle by using one of the control rules based on the position of the vehicle on the map, the map information, and a detection result of the vehicle-mounted sensor,
recognize the road section in a traveling direction of the vehicle based on the position of the vehicle on the map and the map information,
specify the control rule used in the road section based on the recognized road section and the control rule data, and control traveling of the vehicle in the road section by using the specified control rule, and
apply an operating range in which a guard value of drive power in the operating range of a throttle actuator is less than a reference value, when the road section is a road section that has a curvature of the road greater than or equal to a certain value and a rate of change in curvature greater than or equal to a certain value and has a wall set on a side of the road.

11. A vehicle control system comprising:
a vehicle-mounted sensor configured to detect a traveling state of a vehicle and an environment surrounding the vehicle;
a map database configured to store map information;
a control rule database configured to store control rule data in which one of a plurality of control rules set in advance is associated with each road section set in advance on a map;
a driving operation detection sensor configured to detect a driving operation performed by a driver of the vehicle;
a vehicle operating characteristic database configured to store vehicle operating characteristic data in which one of a plurality of vehicle operating characteristics set in advance is associated with each road section on the map; and
an electronic control unit configured to
recognize a position of the vehicle on the map,
control traveling of the vehicle by using one of the control rules based on the position of the vehicle on the map, the map information, and a detection result of the vehicle-mounted sensor,
recognize the road section in a traveling direction of the vehicle based on the position of the vehicle on the map and the map information,
specify the control rule used in the road section based on the recognized road section and the control rule data, and control traveling of the vehicle in the road section by using the specified control rule,
specify the vehicle operating characteristic applied in the road section based on the recognized road section and the vehicle operating characteristic data during the driving operation performed on the vehicle by the driver, and apply the vehicle operating characteristic to traveling of the vehicle in the road section during the driving operation performed on the vehicle by the driver, and
apply, to traveling of the vehicle, a vehicle operating characteristic that decreases a head-turning property of the vehicle from a reference value and increases steering reaction force from a reference value, when the road section is a curvature changing section in which a rate of change in a curvature of the road is greater than or equal to a certain value.

* * * * *